United States Patent
Selvaraj et al.

(10) Patent No.: US 7,630,945 B2
(45) Date of Patent: Dec. 8, 2009

(54) BUILDING SUPPORT VECTOR MACHINES WITH REDUCED CLASSIFIER COMPLEXITY

(75) Inventors: Sathiya Keerthi Selvaraj, South Pasadena, CA (US); Dennis M. DeCoste, La Canada, CA (US)

(73) Assignee: Yahoo! Inc., Sunnyvale, CA (US)

( * ) Notice: Subject to any disclaimer, the term of this patent is extended or adjusted under 35 U.S.C. 154(b) by 313 days.

(21) Appl. No.: 11/432,764

(22) Filed: May 10, 2006

(65) Prior Publication Data

US 2007/0011110 A1    Jan. 11, 2007

Related U.S. Application Data

(60) Provisional application No. 60/680,348, filed on May 12, 2005.

(51) Int. Cl.
*G06N 5/00* (2006.01)
(52) U.S. Cl. ...................................... 706/45
(58) Field of Classification Search .................. 706/45
See application file for complete search history.

(56) References Cited

U.S. PATENT DOCUMENTS

2005/0216426 A1 *  9/2005  Weston et al. .................. 706/12

OTHER PUBLICATIONS

Parrado-Hernandez,E. et al. "Growing support vector classifiers with controlled complexity" Pattern Recognition. vol. 36, Issue 7, pp. 1479-1488, Jul. 2003.*

Fung,G. et al. "Finite Newton method for Lagrangian support vecotor machine classification" Data Mining Institute Technical Report 02-01, pp. 1-22, Feb. 2002.*
Trafalis,T.B. et al. "An analytic center machine" Machine Learning vol. 46 Issue 1-3, pp. 203-223, 2002.*
Milgram,J. et al. "Speeding up the decision making of support vector classifiers" IEEE Proc. of the 9th Int'l Workshop on Frontiers in Handwriting Recognition (IWFHR-9 2004), pp. 57-62, 2004.*
Ali,S. et al. "Automatic parameter selection for polynomial kernel" IEEE Information Reuse and Integration, pp. 243-249, Oct. 2003.*
Bi,J. et al. "Column-generation boosting methods for mixtrue of kernels" ACM KDD'04, pp. 521-526, Aug. 2004.*
Diehl,C.P. et al. "SVM incremental learning, adaptation and optimization" IEEE Proc. of the Int'l Joint Conference on Neural Networks, vol. 4., pp. 2685-2690, Jul. 2003.*

(Continued)

*Primary Examiner*—David R Vincent
*Assistant Examiner*—Benjamin Buss
(74) *Attorney, Agent, or Firm*—Seth H. Ostrow; Ostrow Kaufman & Frankl LLP (57) ABSTRACT

Support vector machines (SVMs), though accurate, are not preferred in applications requiring great classification speed, due to the number of support vectors being large. To overcome this problem a primal system and method with the following properties has been devised: (1) it decouples the idea of basis functions from the concept of support vectors; (2) it greedily finds a set of kernel basis functions of a specified maximum size ($d_{max}$) to approximate the SVM primal cost function well; (3) it is efficient and roughly scales as $O(nd_{max}^2)$ where n is the number of training examples; and, (4) the number of basis functions it requires to achieve an accuracy close to the SVM accuracy is usually far less than the number of SVM support vectors.

14 Claims, 4 Drawing Sheets

OTHER PUBLICATIONS

Guyon,I et al. "An Introduction to Variable and Feature Selection" Journal of Machine Learning Research 3: 1157-1182. 2003.*

Bennett,K.P. et al. "MARK: A Boosting Algorithm for Heterogeneous Kernel Models" SIGKDD 2002.*

Weston,J. et al. "Feature Selection for SVMs" 2001.*

Hermes,L. et al. "Feature Selection for Support Vector Machines" IEEE. 2000.*

* cited by examiner

BUILDING SUPPORT VECTOR MACHINES WITH REDUCED CLASSIFIER COMPLEXITY

CROSS-REFERENCE TO RELATED APPLICATIONS

This application is based on U.S. Provisional Application No. 60/680,348, filed May 12, 2005, which is/are herein incorporated by reference in its/their entirety.

FIELD OF THE INVENTION

The invention relates to a system and method for building support vector machines with reduced classifier complexity. More specifically, a system and method incrementally finds basis functions to maximize accuracy, and the process of adding new basis functions is stopped when the classifier has reached a level of complexity.

BACKGROUND OF THE INVENTION

Support Vector Machines (SVMs) are modern learning systems that deliver state-of-the-art performance in real world pattern recognition and data mining applications, such as text categorization, hand-written character recognition, image classification and bioinformatics. Even though SVMs yield accurate solutions, they are not preferred in online applications where classification has to be performed at great speed. This is because a large set of basis functions is usually needed to form the SVM classifier, making it complex and expensive.

SUMMARY

Briefly, and in general terms, to solve the above problems with prior art systems, various embodiments are directed to a computerized system and method learning for categorizing and labelling elements. In a preferred embodiment, the system establishes an empty set of basis functions. A basis function from a set of training functions is selected. The basis function is added to the set of to the set of basis functions. One or more parameters associated with the set of basis functions are optimized. The selecting, adding and optimizing are repeated until a set limit of complexity in the number of basis functions is reached.

In one preferred embodiment, the optimizing comprises using a Newton optimization method to optimize the one or more parameters. In another preferred embodiment, the selecting comprises selecting a basis element randomly from the set of training elements. In yet another preferred embodiment, the selecting of a basis element comprises selecting a basis element based on computing of a score for the basis element. In yet another preferred embodiment, a cache is used to store the selected basis functions. In yet another preferred embodiment, elements are excluded from the training set when they are estimated to not improve optimization. In yet another preferred embodiment, hyperparameters are determined for optimization.

Other features and advantages will become apparent from the following detailed description, taken in conjunction with the accompanying drawings, which illustrate by way of example, the features of the various embodiments.

DETAILED DESCRIPTION

Referring now to the drawings, wherein like reference numerals denote like or corresponding parts throughout the drawings and, more particularly to FIGS. 1-4 there are shown various embodiments of a system for building support vector machines with reduced classifier complexity. In one embodiment, a method incrementally finds basis functions to maximize accuracy. The process of adding new basis functions is stopped when the classifier has reached a level of complexity. In some embodiments, the method forms classifiers that have an order of magnitude of a smaller number of basis functions compared to a full SVM, while achieving substantially the same level of accuracy.

Figure 1:
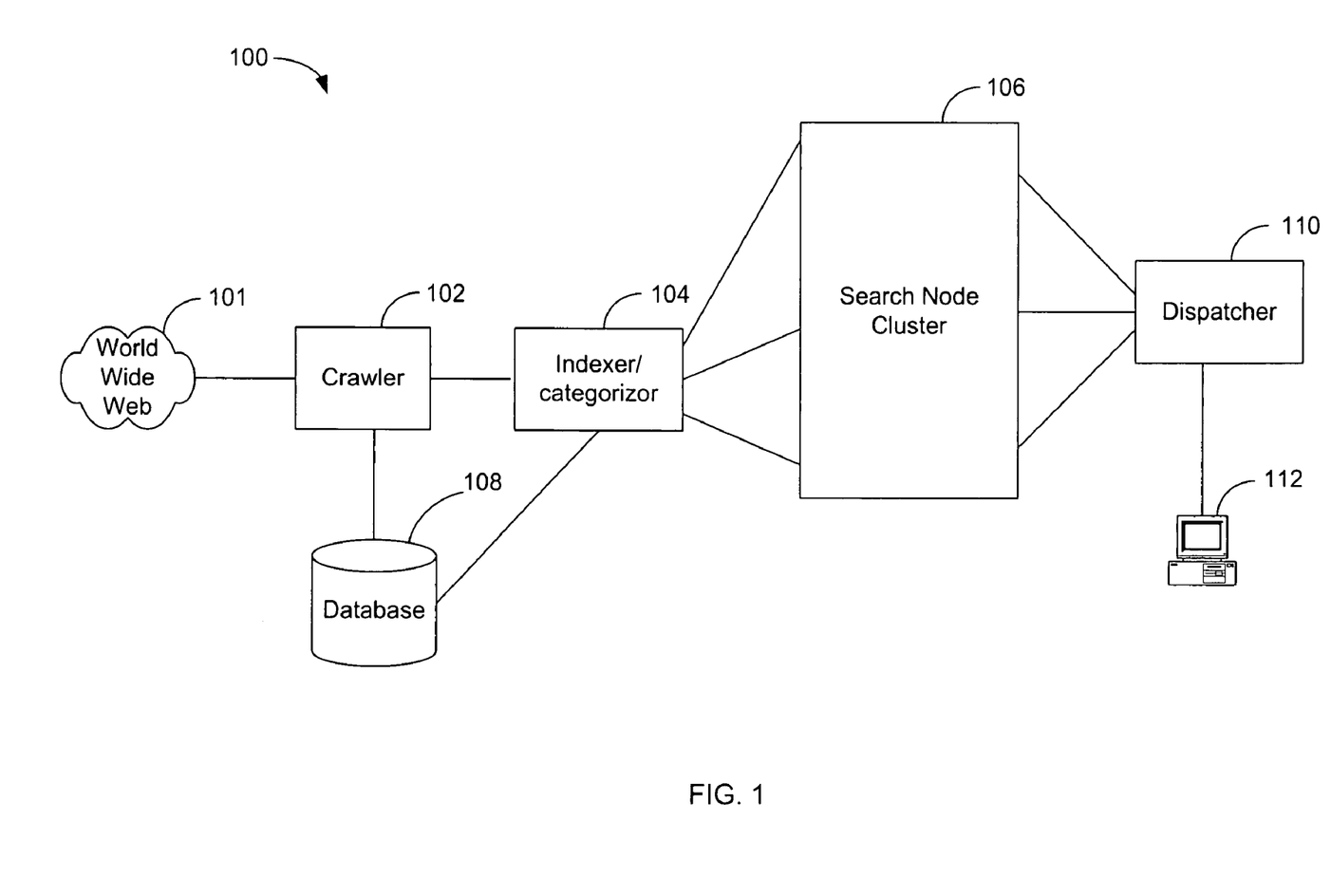
FIG. 1 is a block diagram illustrating components of a search engine in which one embodiment operates.

In one embodiment, as an example, and not by way of limitation, an improvement in Internet search engine categorization and scoring of web pages is provided. The World Wide Web is a distributed database comprising billions of data records accessible through the Internet. Search engines are commonly used to search the information available on computer networks, such as the World Wide Web, to enable users to locate data records of interest. A search engine system 100 is shown in FIG. 1. Web pages, hypertext documents, and other data records from a source 101, accessible via the Internet or other network, are collected by a crawler 102. The crawler 102 collects data records from the source 101. For example, in one embodiment, the crawler 102 follows hyperlinks in a collected hypertext document to collect other data records. The data records retrieved by crawler 102 are stored in a database 108. Thereafter, these data records are indexed by an indexer 104. Indexer 104 builds a searchable index of the documents in database 108. Common prior art methods for indexing may include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices and each sub-index is sent to a search node in a search node cluster 106.

To use search engine 100, a user 112 typically enters one or more search terms or keywords, which are sent to a dispatcher 110. Dispatcher 110 compiles a list of search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to user 112 sorted by relevance scores. The relevance score is a function of the query itself and the type of document produced. Factors that affect the relevance score may include: a static relevance score for the document such as link cardinality and page quality, placement of the search terms in the document, such as titles, metadata, and document web address, document rank, such as a number of external data records referring to the document and the "level" of the data records, and document statistics such as query term frequency in the document, global term frequency, and term distances within the document. For example, Term Frequency Inverse Document Frequency (TFIDF) is a statistical technique that is suitable for evaluating how important a word is to a document. The importance increases proportionally to the number of times a word appears in the document but is offset by how common the word is in all of the documents in the collection.

Figure 2:
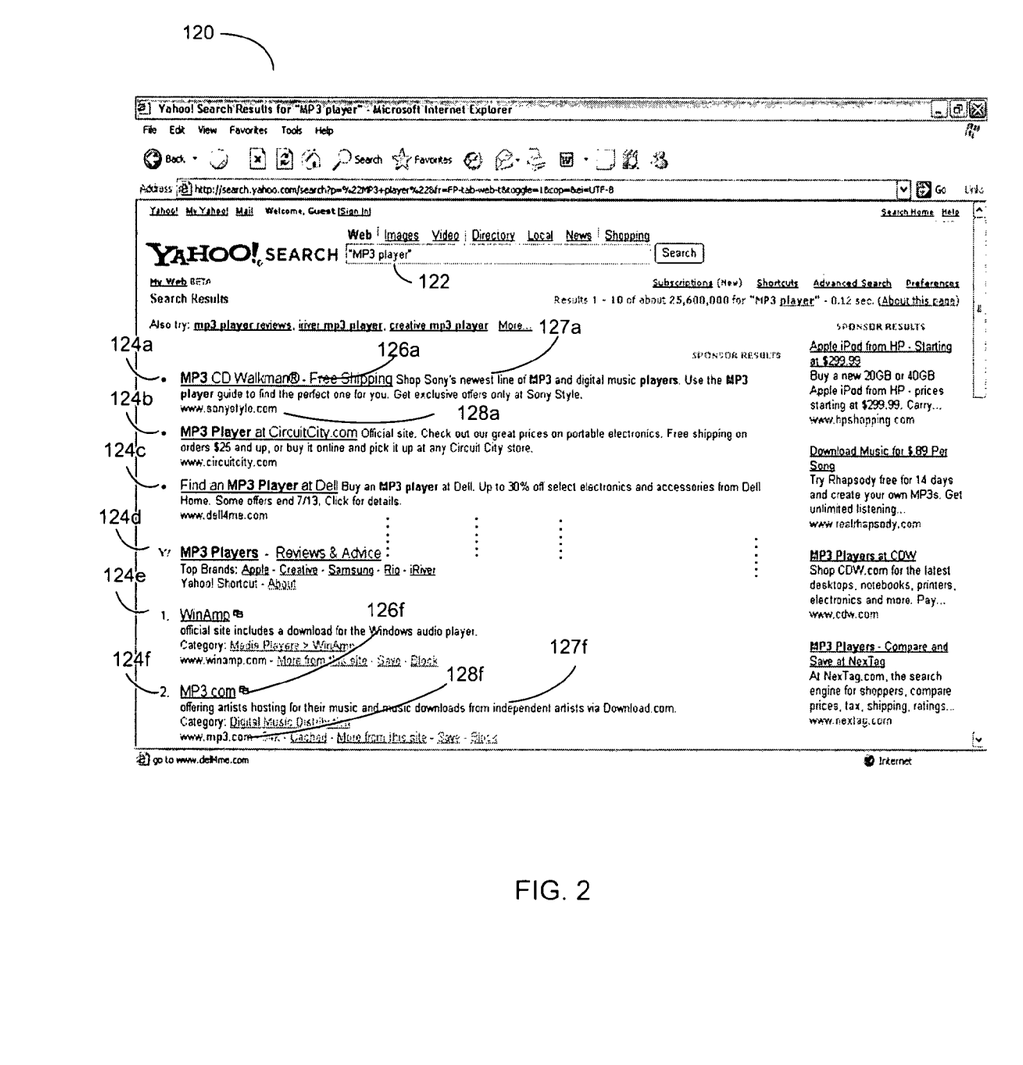
FIG. 2 is an example of a result set for the search engine of FIG. 1.

Referring to FIG. 2, there is shown an example of a result set 120. As shown therein, in response to a query 122 for the search term "MP3 player" shown on the top of the figure, the search engine YAHOO! searched its web index and produced a plurality of results in the form of result set 120 displayed to a user. For brevity, only a first page of result set 120 is shown. Result set 120 includes six results 124a-f, each with a respective clickable hyperlink 126a-f, description 127a-f, and Internet addresses or uniform resource locator (URL) 128a-f for data records that satisfy query 122. Usually the number of web pages in the result set is very large, sometimes even as large as a million. It is important to ensure that the documents displayed to the user are ordered according to relevance, with the most relevant displayed at the top.

Figure 3:
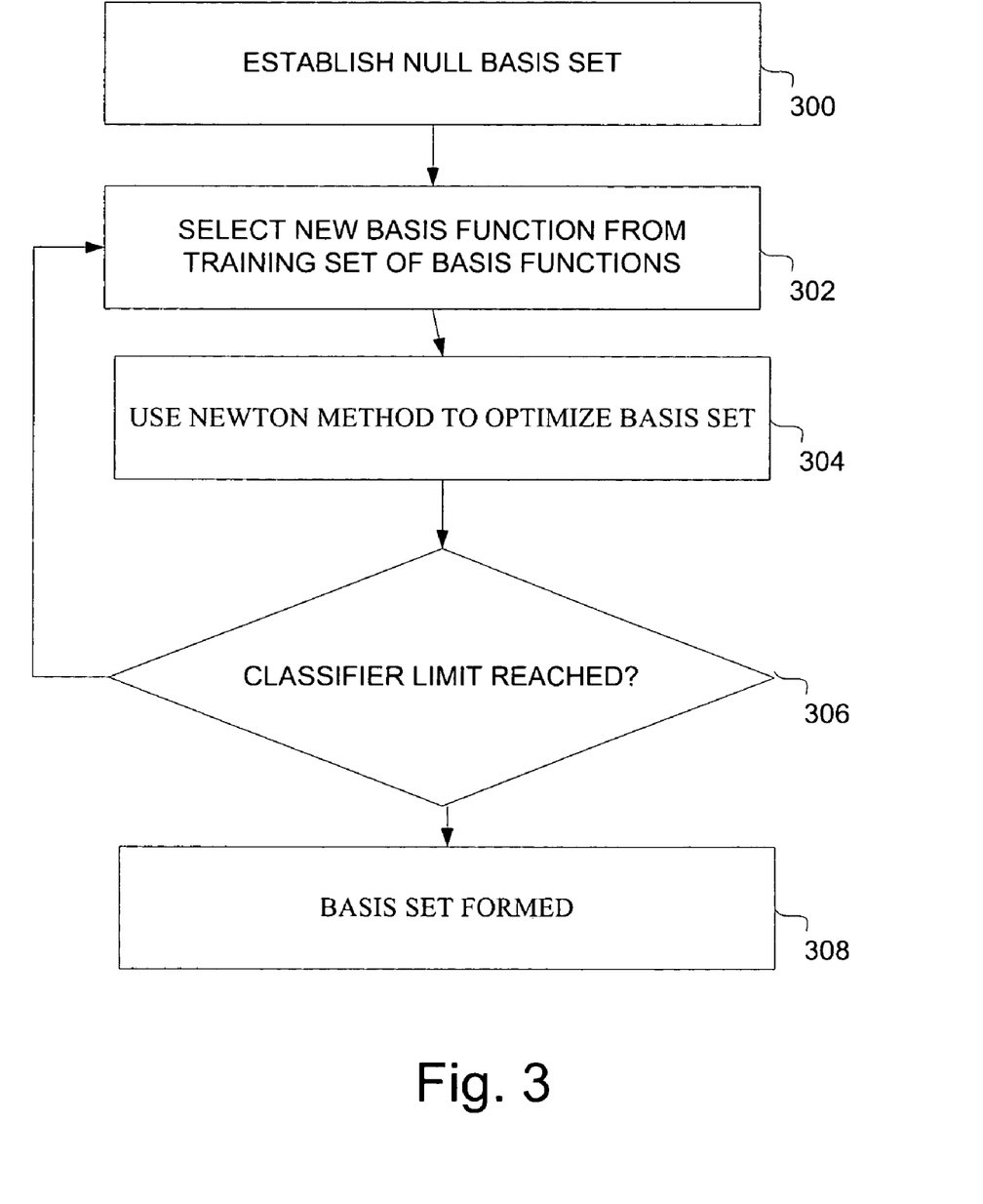
FIG. 3 is a flow diagram that illustrates steps performed by an indexer/categorizer of FIG. 1.

With reference to FIG. 3, a flow diagram illustrates the steps performed by the indexer/categorizer 104. In step 300, an empty, or null, basis function set is established. A kernel basis function is selected for the SVM from a set of basis functions located at the training points, step 302. Next, the parameters associated with the basis set are optimized, step 304. A pre-set limit on the number of basis functions is compared against the number of basis functions in the basis set, step 306. If the limit has not been reached, then processing moves back to step 302 to select another basis function from the training set. Otherwise, the basis set is formed, step 308.

In the above example of ranking of search results by a search engine, in response to a query given by a user, a search engine obtains a large set of web pages that satisfy the query. Of these results, some are relevant and the remaining are not relevant. The classifier is useful to separate these two sets. Normally, search engines perform this function by extracting a set of features that represent the query, result pair, and apply a nonlinear classifier to separate relevant cases from irrelevant cases. A SVM classifier can perform this function with great accuracy. However, prior SVM classifiers are not preferred by search engines because prior SVM classifiers use tens and thousands of kernel basis functions and hence, the evaluation of the SVM classifier function in real time becomes infeasible. The presently described system and method reduces the number of basis functions drastically, thus making it possible for SVMs to be used in this search engine application. In a similar way, the system and method can find application in many other areas where the complexity of SVM classifiers normally prevents their use in real time.

SVM Solution and Post-Processing Simplification

Given a training set $\{(x_i, y_i)\}_{i=1}^n$, $y_i \in \{1, -1\}$, the support vector machine (SVM) algorithm with an $L_2$ penalization of the training errors includes solving the following primal problem $$\min \frac{\lambda}{2} \|w\|^2 + \frac{1}{2} \sum_{i=1}^n \max(0, 1 - y_i w \cdot \phi(x_i))^2 \quad (1)$$

Computations involving $\phi$ are handled using the kernel function, $k(x_i, x_j) = \phi(x_i) \cdot \phi(x_j)$. The quadratic penalization of the errors makes the primal objective function continuously differentiable. This is advantageous and becomes necessary for developing a primal algorithm, as discussed below. All the methods herein can be easily extended to other differentiable, piecewise quadratic loss functions, for example, the Huber loss.

The standard way to train an SVM is to introduce Lagrange multipliers $\alpha_i$ and optimize them by solving a dual problem. The classifier function for a new input x is then given by the sign of $\Sigma_i \alpha_i y_i k(x, x_i)$. Because there is a flat part in the loss function, the vector $\alpha$ is usually sparse. The $x_i$ for which $\alpha_i \neq 0$ are called support vectors (SVs). Let $n_{SV}$ denote the number of SVs for a given problem. For large problems, this number can be large and the training and testing complexities might become prohibitive since they are respectively, $O(n \cdot n_{SV} + n_{SV}^3)$ and $O(n_{SV})$.

Direct Simplification Via Basis Functions and Primal

Instead of finding the SVM solution by maximizing the objective function of the dual problem, the method in one embodiment is to directly minimize the primal form after invoking the representer theorem to represent w as $$w = \sum_{i=1}^n \beta_i \phi(x_i) \quad (2)$$

If $\beta_i \neq 0$ for all i, and a substitution of equation (2) is made in equation (1), and $\beta_i$'s are solved, then (assuming uniqueness of solution) the result is $\beta_i = y_i \alpha_i$, and thus, the SVM solution is precisely retrieved. However, in one embodiment, the goal is to obtain approximate solutions that have as few non-zero $\beta_i$'s as possible. For many classification problems there exists a small subset of the basis functions suited to the complexity of the problem being solved, irrespective of the training size growth, that will yield pretty much the same accuracy as the SVM classifier.

In one embodiment, the system deliberately uses the variable name, $\beta_i$ in equation (2) so as to interpret it as a basis weight as opposed to viewing it as $y_i \alpha_i$ where $\alpha_i$ is the Lagrange multiplier associated with the i-th primal slack constraint. While the two are (usually) one and the same at exact optimality, they can be very different when in suboptimal primal solutions. There are many advantages to conceptualizing $\beta_i$'s as basis weights that yield a good suboptimal w for equation (1). First, the system does not have to put any bounds on the $\beta_i$. Second, the system does not have to relate $\beta_i$ to a particular location relative to the margin planes to have a certain value. Further, the system does not have to restrict the basis functions to be a subset of the training set examples.

The system provides an effective greedy SVM that uses a basis selection criterion that is directly related to the training cost function and is also very efficient. One key feature of the method is forward selection. It starts with an empty set of basis functions and greedily chooses new basis functions (from the training set) to improve the primal objective function. The system embodies efficient schemes for both the greedy selection of a new basis function, and the optimization of the $\beta_i$ for a given selection of basis functions. For choosing up to $d_{max}$ basis functions, the overall computational cost of the method is $O(nd_{max}^2)$.

The Basic Optimization

Let $j \subset \{1, \ldots, n\}$ be a given index set of basis functions that form a subset of the training set. The problem of minimizing the objective function in (1) over the set of vectors w is of the form $$w = \sum_{j \in J} \beta_j \phi(x_j) \qquad (3)$$

Newton Optimization

Let $K_{ij}=k(x_i, x_j)=\phi(x_i)\cdot\phi(x_j)$ denote the generic element of the n×n kernel matrix K. The notation $K_{IJ}$ refers to the submatrix of K made of the rows indexed by I and the columns indexed by J. Also, for a n-dimensional vector p, let $p_J$ denote the |J| dimensional vector containing $\{p_j: j \in J\}$.

Let $d=|J|$. With w restricted to equation (3), the primal problem (equation (1)) becomes the d dimensional minimization problem of finding $\beta_J$ that solves $$\min_{\beta_J} f(\beta_J) = \frac{\lambda}{2} \beta_J^T K_{JJ} \beta_J + \frac{1}{2} \sum_{i=1}^n \max(0, 1 - y_i o_i)^2 \qquad (4)$$

where $o_i = J_{i,J} \beta_J$. Except for the regularizer being more general, i.e., $\beta_J^T K_{JJ} \beta_J$ (as opposed to the simple regularizer, $\|\beta_J\|^2$) the problem in equation (4) is very much the same as in a linear SVM design. Thus, the Newton method and its modification that are developed for linear SVMs can be used to solve equation (4) and obtain the solution $\beta_J$.

Newton Method

Figure 4:
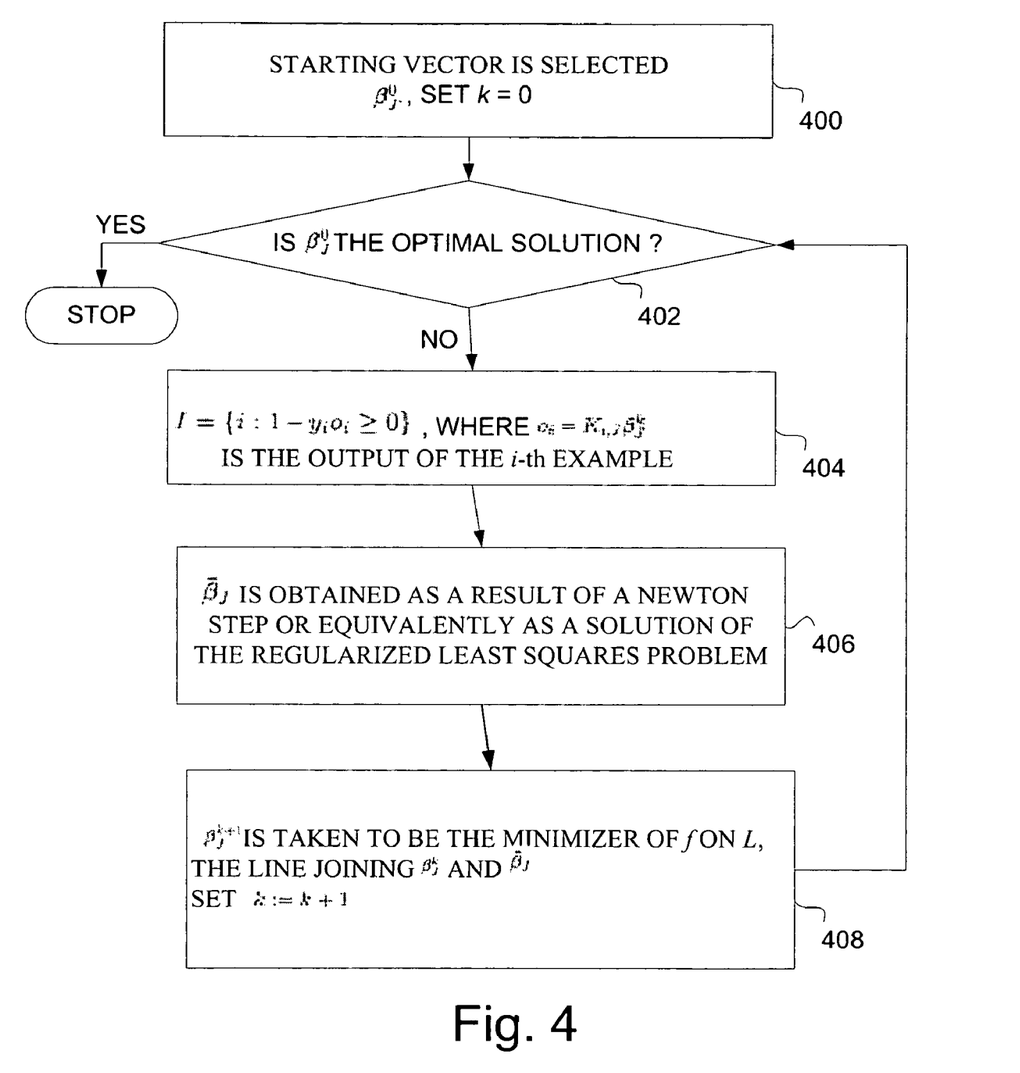
FIG. 4 is a flow diagram that illustrates a Newton method used in accord with one embodiment.

With reference to FIG. 4, a flow diagram illustrates a Newton method used in accord with one embodiment. In step 400, a suitable starting vector is selected, $\beta_J^0$, Set k=0. In step 402, if $\beta_J^k$ is the optimal solution of equation (4), then the method is stopped. Otherwise, in step 404, let $I=\{i: 1-y_i o_i \geq 0\}$ where $o_i = K_{i,J} \beta_J^k$ is the output of the i-th example. In step 406 $\bar{\beta}_J$ is obtained as the result of a Newton step or equivalently as the solution of the regularized least squares problem, $$\min_{\beta_J} \frac{\lambda}{2} \beta_J^T K_{JJ} \beta_J + \frac{1}{2} \sum_{i \in I} (1 - y_i K_{i,J} \beta_J)^2 \qquad (5)$$

In step 408, $\beta_J^{k+1}$ is taken to be the minimizer of f on L, the line joining $\beta_J^k$ and $\bar{\beta}_J$. k:=k+1 is set, and processing returns to step 402 for another iteration.

The solution of equation (5) is given by $$\bar{\beta}_J = \beta_J^k - P^{-1} g, \text{ where } P = \lambda K_{JJ} + K_{JI} K_{JI}^T \text{ and } g = \lambda K_{JJ} \beta_J - K_{JI}(y_I - o_I). \qquad (6)$$

P and g are also the (generalized) Hessian and gradient of the objective function in equation (4).

Because the loss function is piecewise quadratic, the Newton method converges in a finite number of iterations. The number of iterations required to converge to the exact solution of equation (4) is typically very small (e.g., in one embodiment, less than 5).

Updating the Hessian

As already pointed out in above, one objective is to solve equation (4) in an incremental mode: with the solution $\beta_J$ of equation (4) already available, the next step is to solve equation (4) again, but with one more basis function added, i.e., J incremented by one. Since the kernel matrix is dense, the system maintains and updates a Cholesky factorization of P, the Hessian defined in equation (6). Even with J fixed, during the course of solving equation (4) via the Newton method, P, will undergo changes due to changes in I. Efficient rank one schemes can be used to do the updating of the Cholesky factorization. The updatings of the factorization of P, that are performed because of changes in I are not expensive because such changes mostly occur when J is small; when J is large, I usually undergoes very small changes since the set of training errors is rather well identified by that stage. Of course P, and its factorization also undergo changes (their dimensions increase by one) each time an element is added to J. This is a routine updating operation that is present in most forward selection methods.

Computational Complexity

One issue relates the complexity of the incremental computations needed to solve equation (4) when its solution is available for J, at which point one more basis element is included in it and the system is to re-solve equation (4). In the best case, when the support vector set I does not change, the cost is mainly the following: computing the new row and column of $K_{JJ}$ (d+1 kernel evaluations); computing the new row of $K_{JI}$ (n kernel computations); computing the new elements of P(O(nd)cost); and the updating of the factorization of P(O)($d^2$)cost). Thus the cost can be summarized as: (n+d+1) kernel evaluations and O(nd) cost. Even when I does change and so the cost is more, it is reasonable to take the above-mentioned cost summary as a good estimate of the cost of the incremental work. Adding up these costs until $d_{max}$ basis functions are selected, the complexity of $O(nd_{max}^2)$ is obtained. It should be noted that this is the basic cost given that the sequence of $d_{max}$ basis functions that are to be used is known. Thus, $O(nd_{max}^2)$ is also the complexity of the method in which basis functions are selected randomly. In the next section the problem of selecting the basis functions systematically and efficiently is discussed.

Selection of New Basis Element

Suppose equation (4) has been solved and the minimizer $\beta_J$ has been obtained. The minimum value of the objective function in equation (4) (e.g., $fJ$) is greater than or equal to $f^*$, the optimal value of equation (1). If the difference between them is large, in one embodiment, processing is continued to include another basis function. If $j \notin J$, the issue is how to judge its value of inclusion. In one embodiment, the following scoring mechanism is used.

Basis Selection Method 1

In one embodiment, in a method for selecting a basis element, the system includes j in J, and optimizes equation (4)

fully ($\beta_J$, $\beta_j$), and finds the improved value of the objective function; called $\tilde{\mathcal{F}}_j$. The system chooses the j that gives the least value of $\tilde{\mathcal{F}}_j$. As discussed above, the cost of processing one basis element inclusion is O(nd). So, for processing all elements outside J, the cost is $O(n^2 d_{max}^2)$; the overall cost of such a method of selecting $d_{max}$ basis functions is $O(n^2 d_{max}^2)$, which is much higher than the basic cost, $O(nd_{max}^2)$ discussed. Instead, if working only with a random subset of size κ selected from outside J, then the cost in one basis selection step is reduced down to O(κnd), and the overall cost is limited to $O(\kappa n d_{max}^2)$. However, it should be noted that, even with this method, the cost of new basis selection (O(κnd)) is still disproportionately higher (by κ times) than the cost of actually including the newly selected basis function (O(nd)). Thus other embodiments use cheaper methods discussed below.

Basis Selection Method 2

In another embodiment, a method computes a score for a new element j in O(n) time similar to Matching Pursuit methods for least squares loss functions. Including a new element j and its corresponding variable, $\beta_j$ yields the problem of minimizing $$\frac{\lambda}{2}(\beta_J^T\ \beta_j)\begin{pmatrix}K_{JJ} & K_{Jj}\\K_{jJ} & K_{jj}\end{pmatrix}\begin{pmatrix}\beta_J\\\beta_j\end{pmatrix}+\frac{1}{2}\sum_{i=1}^{n}\max(0,1-y_i(K_{iJ}\beta_J+K_{ij}\beta_j))^2, \quad (7)$$

$\beta_J$ is fixed and the system optimizes equation (7) using only the new variable $\beta_j$ the amount of improvement is determined in the objective function in order to define a score for the new element j.

This one dimensional function is piecewise quadratic and can be minimized in (O)(n log n) time by a dichotomy search on the different breakpoints. However, a very precise calculation of the scoring function is usually unnecessary. So, for a practical solution, in one embodiment, the system performs a number of Newton-Raphson-type iterations on the derivative of the function to get a near optimal solution in Q(n) time. The vector $K_{Jj}$ is also computed, using d kernel evaluations.

If all j∉J are tried, then the complexity of selecting a new basis function is $O(n^2)$, which is disproportionately large compared to the cost of including the selected basis function, which is O(nd). As discussed in the Basis Selection Method 1 section above, the system can merely choose κ random basis functions to try. If $d_{max}$ is specified, the system can choose $\kappa = O(d_{max})$ without increasing the overall complexity beyond $O(nd_{max}^2)$.

Kernel Caching

For medium size applications and smaller, for example n<15,000, in one embodiment, a cache is used for the entire kernel matrix. If additional memory space is available and, for example, a Gaussian kernel is employed, then the values of $\|x_i - x_j\|^2$ can also be cached. This helps significantly to reduce the time associated with the tuning of hyperparameters. For larger problems, depending on memory space available, it is a good idea to cache as many as possible full kernel rows corresponding to j that are tried, but are not chosen for inclusion. It is possible that they get called in a later stage of the algorithm, at which time, this cache can be useful. Variations of caching can be used. In one embodiment, full kernel rows corresponding to a large set (as much as can fit into memory) of randomly selected training basis are pre-computed, and only these basis functions are considered for selection.

Shrinking

As basis functions get added, the SVM solution w and the margin planes start stabilizing. If the number of support vectors form a small fraction of the training set, then, for a large fraction of (well-classified) training examples, it can be concluded that they will most likely never come into the active set I. Such training examples can be left out of the calculations for improved processing.

Hyperparameter Tuning

In one embodiment, the values of hyperparameters are determined. This can be done using k-fold cross validation. Cross validation (CV) can also be used to choose d, the number of basis functions. Since the solution given by the described method approaches the SVM solution as d becomes large, there is no need to choose d at all. the system can simply choose d to be as big a value as possible. However, to achieve good reduction in the classifier complexity (as well as computing time), in one embodiment, the system tracks the validation performance as a function of d, and stops when this function becomes nearly flat. The system proceeds as follows. First an appropriate value for $d_{max}$ is selected. For a given choice of hyperparameters, the basis selection method (for example, Basis Selection Method 2) is then applied on each training set formed from the k-fold partitions until $d_{max}$ basis functions are selected. This gives an estimate of the k-fold CV error for each value of d from 1 to $d_{max}$. The system selects d to be the number of basis functions that gives the lowest k-fold CV-error. In one embodiment, this computation can be repeated for each set of hyperparameter values and the best choice can be decided.

Recalling that, at stage d, the basis selection methods choose the (d+1)-th basis function from a set of κ random basis functions, to avoid the effects of this randomness on hyper-parameter tuning, in one embodiment, the system makes this κ-set dependent only on d. Thus, at stage d, the basis selection methods will choose the same set of κ random basis functions for all hyperparameter values.

In one embodiment, gradient-based adaptation is performed when many hyperparameters are present. For example, the following Gaussian kernel with ARD hyperparameters can be used:

$$k(x_i, x_j) = h_b + h_e \exp\left(\sum_l w^l (x_i^l - x_j^l)^2 / 2\right) \quad (8)$$

where $x^l$ is the l-th component of the input vector, x. The hyperparameters are: λ, $h_b$, $h_e$ and the $w^l$'s. (Note: λ is the regularization parameter in equation (1).) In order to tune these hyperparameters a function that is an estimate of the generalization error and is also differentiable is used, so that gradient descent can be performed in the hyperparameter space. Such an estimating function can be developed by using a combination of leave-one-out (LOO) error and Platt's sigmoid probability function.

In considering a situation when the system has selected the required number of basis functions and have the final $\beta_J$ (solution of (4)), keeping the basis functions the same, leaving out the i-th example and retraining it (i.e., re-solving equation (4)), let $\beta_J^i$ denote the modified solution. If it is assumed that the support vector set, I will remain unchanged, then $\beta_J^i$ is the solution of:

$$(P-\alpha_i\alpha_i^T)\beta_J^i = A_{IJ}y_J - y_i\alpha_i \qquad (9)$$

By using the Woodbury matrix identity for computing $[P-\alpha_i\alpha_i^T]^{-1}$ from $P^{-1}$ and performing simplifications, the simple formula for the LOO output of the i-th example is obtained:

$$v_i = (\beta_J^i)^T a_i = o_i - (y_i - o_i)\frac{\phi_i}{(1-\phi_i)} \qquad (10)$$

where $o_i = \beta_J^T \alpha_i$ is the training output as before, and $\phi_i = \alpha_i^T P^{-1}\alpha_i$. Since a factorization of P is available, LOO outputs are simple to obtain.

It should be noted that, if $i \notin I$, then leaving out the i-th example causes no change to equation (4) and therefore, $$v_i = o_i, \text{ if } i \notin I \qquad (11)$$

Using the $v_i$ an estimate of generalization error can be made by counting the number of misclassifications. However, such an estimate is not differentiable. To generate a differentiable estimate, Platt's sigmoid probability ideas are used. This is performed by choosing the probability generating function to be $$p(y_i) = \frac{1}{1 + \exp(-y_i(pv_i + q))} \qquad (12)$$

The two sigmoid parameters, p and q are obtained by minimizing the negative log-likelihood, $$\mathcal{L} = \sum_{i=1}^{n} -\log[1 + \exp(-y_i(pv_i + q))] \qquad (13)$$

L can also be optimized to obtain the hyperparameters. The gradient of L with respect to the hyperparameters can be obtained using (10)-(13).

The function that is optimized, L, is also a function of J, which itself is a complicated discrete-valued function of the hyperparameters. There is no need to consider this aspect in computing the derivatives. In one embodiment, an EM algorithm use used. First, J is found while fixing the hyperparameters. Then, J is fixed and the hyperparameters are changed using the gradient information. It is appropriate to employ an optimization method such as the Quasi-Newton method, which is insensitive to the noise in the gradient evaluation.

Thus, a fast primal algorithm that greedily chooses a subset of the training basis functions to approximate the SVM solution has been described. As the subset grows, the solution converges to the SVM solution, since choosing the subset to be the entire training set is guaranteed to yield the exact SVM solution. One key of the method lies in its ability to form very good approximations of the SVM classifier with a clear control on the complexity of the classifier (number of basis functions) as well as the training time. Performance very close to that of the SVM is achieved using a set of basis functions whose size is a small fraction of the number of SVM support vectors. The graded control over the training time offered by this method can be valuable in large scale data mining. Many times, simpler algorithms such as decision trees, are preferred over SVMs when there is a severe constraint on computational time. While there is no satisfactory way of performing early ending with SVMs, this method enables the user to control the training time by choosing the number of basis functions to use.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A computerized method for learning for categorizing elements and generating search results, comprising:
   building a searchable index of documents in a database wherein the database is searchable to return a result set;
   using a classifier to separate documents returned in the result set,
   establishing an empty set of basis functions associated with the classifier;
   storing, in a computer readable medium, the empty set of basis functions associated with the classifier;
   selecting a kernel basis function from a collection of training basis functions located at one or more training points;
   adding the selected basis function to the set of basis functions;
   incrementing an actual basis functions count;
   optimizing one or more parameters associated with the set of basis functions;
   comparing a predetermined number of basis functions against the actual basis functions count;
   repeating the steps of selecting, adding, incrementing and optimizing until the actual basis functions count reaches the predetermined number of basis functions;
   generating a basis set; and
   generating a search result set in response to a search request on the database based on the basis set.

2. The method of claim 1, wherein the step of optimizing comprises using a Newton optimization method to optimize the one or more parameters.

3. The method of claim 1, wherein the step of selecting comprises selecting a basis element randomly from the set of training elements.

4. The method of claim 1, wherein the step of selecting comprises selecting a basis function based on computing a score for the basis function, wherein the score is taken as the achievable improvement in a support vector machine objective function.

5. The method of claim 1, comprising using a cache to store one or more kernel elements corresponding to the set of basis functions.

6. The method of claim 1, comprising excluding for selection basis functions from the collection of training basis functions that are estimated to not improve optimization.

7. The method of claim 1, further comprising determining hyperparameters for optimization.

8. A computerized system for learning for categorizing elements and generating search results, comprising:
   a searchable index of documents in a database, wherein the database is searchable;
   a classifier operative to separate documents returned in the result set;

a computer processor;

a set of instructions executable on the processor for establishing an empty set of basis functions associated with the classifier;

a computer readable medium operative to store the empty set of basis functions associated with the classifier;

a set of instructions executable on the processor for selecting a kernel basis function from a collection of training basis functions located at the training points;

a set of instructions executable on the processor for adding the selected basis function to the set of basis functions;

a set of instructions executable on the processor for incrementing an actual basis functions count;

a set of instructions executable on the processor for optimizing one or more parameters associated with the set of basis functions;

a set of instructions executable on the processor for comparing a predetermined number of basis functions against the actual basis functions count;

a set of instructions executable on the processor for repeating the steps of selecting, adding, incrementing and optimizing until the actual basis functions count reaches the predetermined number of basis functions;

a set of instructions executable on the processor for generating a basis set; and a set of instructions executable on the processor for generating a search result set in response to a search request on the database based on the basis set.

9. The system of claim 8, wherein the set of instructions for optimizing comprises Newton optimization instructions to optimize the one or more parameters.

10. The system of claim 8, wherein the set of instructions for selecting comprises a set of instructions for selecting a basis element randomly from the set of training elements.

11. The system of claim 8, wherein the set of instructions for selecting comprises a set of instructions for selecting a basis function based on computing a score for the basis function, wherein the score is taken as the achievable improvement in a support vector machine objective function.

12. The system of claim 8, further comprising a cache to store one or more kernel elements corresponding to the selected basis functions.

13. The system of claim 8, further comprising a set of instructions executable on the processor for excluding for selection basis functions from the collection of training basis functions that are estimated to not improve optimization.

14. The system of claim 8, further comprising a set of instructions executable on the processor for determining hyperparameters for optimization.

* * * * *

UNITED STATES PATENT AND TRADEMARK OFFICE
CERTIFICATE OF CORRECTION

PATENT NO.        : 7,630,945 B2                                        Page 1 of 1
APPLICATION NO.   : 11/432764
DATED             : December 8, 2009
INVENTOR(S)       : Selvaraj et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this

Second Day of November, 2010

David J. Kappos
*Director of the United States Patent and Trademark Office*